(12) United States Patent
Whitehill et al.

(10) Patent No.: US 6,404,756 B1
(45) Date of Patent: Jun. 11, 2002

(54) METHODS AND APPARATUS FOR COORDINATING CHANNEL ACCESS TO SHARED PARALLEL DATA CHANNELS

(75) Inventors: Eric A. Whitehill; Tim Dempsey, both of Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 26 days.

(21) Appl. No.: 09/705,588

(22) Filed: Nov. 3, 2000

Related U.S. Application Data

(60) Provisional application No. 60/163,257, filed on Nov. 3, 1999.

(51) Int. Cl.[7] .............................................. H04L 12/413
(52) U.S. Cl. ........................ 370/338; 370/439; 370/445
(58) Field of Search ................................ 370/322, 348, 370/364, 438, 439, 442, 443, 444, 445, 468, 225, 226, 227, 228, 338, 347, 447

(56) References Cited

U.S. PATENT DOCUMENTS

| | | | | |
|---|---|---|---|---|
| 5,392,450 A | * | 2/1995 | Nossen | 455/12.1 |
| 5,502,722 A | * | 3/1996 | Fulghum | 370/343 |
| 5,615,212 A | * | 3/1997 | Ruszczyk et al. | 370/433 |
| 5,680,392 A | * | 10/1997 | Semaan | 370/261 |
| 5,796,741 A | * | 8/1998 | Saito et al. | 370/439 |
| 5,844,905 A | * | 12/1998 | McKay et al. | 370/443 |
| 5,886,992 A | * | 3/1999 | Raatikainen et al. | 370/410 |
| 5,936,953 A | * | 8/1999 | Simmons | 370/364 |

* cited by examiner

Primary Examiner—Min Jung

(57) ABSTRACT

A network of nodes communicates using plural, shared parallel data channels and a separate reservation channel. Access to the data channels is coordinated among the nodes by communicating message requests and corresponding replies on the reservation channel. In addition to a primary transmitter/receiver (e.g., a modem), each node includes a secondary receiver that permits each node to continuously monitor the reservation channel. When not engaged in a message transfer on one of the data channels, the primary receiver monitors the reservation channel. If the primary becomes engaged in a message transfer, the secondary receiver is activated and monitors the reservation channel. Use of the secondary receiver avoids loss of channel access information resulting from use of a single receiver for both the reservation and data transfer mechanisms. By transmitting requests for channel access on the reservation channel and continuously monitoring the reservation channel, message collisions are dramatically reduced.

113 Claims, 7 Drawing Sheets

METHODS AND APPARATUS FOR COORDINATING CHANNEL ACCESS TO SHARED PARALLEL DATA CHANNELS

CROSS REFERENCE TO RELATED APPLICATION

This application claims priority from U.S. Provisional Patent Application Ser. No. 60/163,257 entitled "Multichannel Carrier Sense Multiple Access with Enhanced Collision Avoidance," filed Nov. 3, 1999. The disclosure of this provisional patent application is incorporated herein by reference in its entirety.

BACKGROUND OF THE INVENTION

1. Field of the Invention

The present invention relates to methods and apparatus for coordinating channel access to shared communication resources, and more particularly, to techniques for allowing a group of network nodes to coordinate channel access to plural parallel data channels thereby permitting efficient and timely transmission of audio, video and data information among the nodes.

2. Description of the Related Art

Carrier Sense Multiple Access with Collision Avoidance (CSMA/CA) is a well-known protocol specified in the IEEE802.11 standard for wireless local area networks (LANs). This protocol specifies two methods for controlling access to a single channel that is shared among a group of users. One method is the point coordination function where channel access is controlled by a central point using a poll-response mechanism. The other method, CSMA/CA, involves an initial handshake of a Request-to-Send (RTS) message followed by a Clear-to-Send (CTS) message exchanged between a source node (e.g., a radio) and a destination node prior to sending an information message (e.g., a message containing audio, video or data information). The source node transmits an RTS message to the intended destination node. If the intended destination node wishes to receive the message and believes that the channel is available (i.e., free of other traffic), the destination node responds with a CTS message. The receipt of the CTS message by the source node permits the transmission of the information message (MSG) which is typically followed by an Acknowledgment (ACK) message from the destination node when reception of the information message is successful. All other nodes within range of the CTS message mark the channel as busy for the duration of the message transfer. Provided all nodes receive every CTS message, the protocol works well.

The throughput of a LAN is dependent upon the total bandwidth available. In the case of the IEEE802.11 standard, all users within a Basic Service Set (BSS) share a single resource (presently 1, 2, 5, or 11 Mbps). The protocol does define multiple frequencies but the purpose of these frequencies is to separate groups of users from one another rather than to promote the use of multiple channels for increased throughput and reduced congestion. The IEEE802.11 protocol is unable to manage the allocations of multiple data channels within a geographic area.

Because of the limited bandwidth available, systems operating under the IEEE802.11 standard have a limited ability to delivery high quality audio, video and data between many users in a small area. This problem is particularly acute with audio (e.g., voice) and video information which must be delivered within a few tens of milliseconds to avoid noticeable delays in reception. If audio and video messages are competing for the same data channel with relatively long data messages, it quickly becomes infeasible to reliably transmit audio and video messages with acceptable delays on a single shared channel.

These limitations could potentially be overcome by sharing multiple data channels among a group of users. Multiple data channels may permit the delivery of high quality audio, video and data among many users in a small area. However, allocation of multiple data channels among several users necessarily requires coordinating the use of the channels so that heavy users (e.g., users transferring large data files) do not block channel access for audio and video within the limited time allocations required for real time delivery. Further, it would be necessary for each node to assess channel availability and reliably communicate requests for access or changes in availability to other nodes without unduly encumbering the system. Accordingly, there exists a need for a system capable of effectively coordinating channel access to multiple shared parallel data channels to permit timely and efficient delivery of high quality audio, video and data information among a group of users in a network.

SUMMARY OF THE INVENTION

Therefore, in light of the above, and for other reasons that become apparent when the invention is fully described, an object of the present invention is to provide increased throughput for message traffic in a network of nodes by employing multiple parallel data channels that are shared among the nodes.

A further object of the present invention is to coordinate among a group of nodes channel access to plural parallel data channels by providing the capability in each node to continuously gather information as to the status of each communication channel and each neighboring node.

Yet a further object of the present invention is to provide enhanced collision avoidance between messages being transferred between nodes of a network over shared communication resources.

A still further object of the present invention is to minimize the impact of transmitting lower priority messages on the delivery of higher priority messages transmitted on a shared communication resource.

Another object of the present invention is to allow each node in a network to continuously monitor channel access requests transmitted between nodes to ensure that each node is aware of the status of its neighboring nodes and channel availability.

Yet another object of the present invention is to allow information messages of varying priorities to be transmitted over a shared communication resource while ensuring minimal time delay for time-sensitive, high-priority information, such as audio and video.

Still another object of the present invention is to permit broadcasting of messages to neighboring nodes of network with minimal impact on other message traffic.

It is a further object of the present invention to avoid contention between messages transmitted over a shared communication resource by controlling timing of message transmission attempts in a prioritized manner to thereby avoid transmission delays for time-sensitive messages.

It is yet a further object of the present invention to provide enhanced feedback to a network node that has unsuccessfully attempted to transmit messages to another node in order to increase the likelihood of successfully re-transmitting the message.

The aforesaid objects are achieved individually and in combination, and it is not intended that the present invention be construed as requiring two or more of the objects to be combined unless expressly required by the claims attached hereto.

In accordance with the present invention, a network of nodes communicates using plural, shared parallel data channels and a separate reservation channel. The reservation channel provides a mechanism for coordinating access to the data channels among the nodes in a manner that enhances avoidance of message traffic collisions. Access to the data channels is coordinated among the nodes by communicating message requests and corresponding replies on the separate reservation channel. Each node includes a primary modem (transceiver) and a secondary modem (which maybe only a receiver), which permits each node to continuously monitor the reservation channel, even when transmitting or receiving a message on one of the data channels. If the primary modem of a node is not engaged in a message transfer, the secondary receiver is deactivated, and the primary modem monitors the reservation channel to keep track of the status of each neighboring node and the availability of each data channel. If the primary modem becomes engaged in a message transfer, the secondary receiver is activated and monitors the reservation channel in the same manner. Use of the secondary receiver prevents the loss of reservation information that would occur if only a single receiver were used for both the channel reservations and data transfers, as is the case in conventional schemes. By transmitting requests for channel access on a separate reservation channel and dedicating one of the two receivers to monitor and respond to such requests, transmission of information messages on the multiple parallel data channels can be coordinated among the nodes, collisions between request messages and information messages are eliminated, and collisions between the short request messages transmitted on the reservation channel are dramatically reduced.

The coordinated use of multiple parallel data channels permits the delivery of high quality audio, video, and data between many users in a small area. With multiple data channels, the lengthy transfer of a large file on one channel does not block access to other channels within the limited time allocations of real time services, such as delivery of audio and video. The present invention permits many users to exchange high quality voice messages, where a voice sample must be delivered within a few tens of milliseconds, while simultaneously permitting the rapid transfer of a data file between other users.

By employing a separate reservation channel to request and confirm access to the data channels, the likelihood of collisions on both the reservation channel and the data channels is dramatically reduced. Because each node continuously monitors the reservation channel, nodes that are involved in a data transfer do not lose any information regarding parallel data transfers that started after the current event. Given this universal knowledge, nodes that return to the reservation channel are able to make a more intelligent decision regarding the channel that is chosen for successive data transfers. This advantage of the present invention is especially critical to the reliable and timely delivery of real-time traffic such as Voice over the Internet protocol on a wireless LAN.

If necessary, the secondary receiver of each node can temporarily be tuned to a data channel to receive a broadcast message while the primary modem is simultaneously engaged in a message transfer with another node. Since valid channel access requests are not generally transmitted during a broadcast message, this temporary re-tuning of the secondary modem carries virtually no penalty in terms of potential loss of channel access information.

In accordance with another aspect of the present invention, channel access requests are scheduled using a contention interval scheme that is structured to insure that high priority messages and voice traffic are handled prior to routine file transfers. The contention interval is created by timing slots of a duration in excess of the combined time to transmit an RTS and CTS. Nodes attempting to transfer voice messages choose a slot near the beginning of the contention interval, and nodes attempting to transfer data messages choose a slot near the end. The random nature of the slot selection insures extremely fast channel access and high channel efficiency at the expense of a minimal number of collisions.

The present invention also includes an enhanced feedback mechanism which provides a source node with important information as to why a particular message attempt failed, thereby enhancing the likelihood of successfully re-transmitting an information message or a channel access request. A negative clear-to-send message informs a source node of insufficient channel quality or message priority and effectively denies channel access to the source node. A negative acknowledge message informs the source node that the information message received by the destination node contains bit errors requiring a retransmission of the message.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

In accordance with the present invention, a network of nodes communicates using plural, shared parallel data channels and a separate reservation channel. Increased throughput is achieved by transferring messages over multiple parallel data channels. However, efficient use of the multiple data channels cannot be realized without a mechanism to coordinate allocation of channel access among the nodes in the network and minimize message collisions. The present invention provides these capabilities by dedicating one channel for use as the reservation channel and allocating channel access on the multiple data channels in a distributed fashion. Access to the data channels is coordinated among the nodes by communicating message requests and corresponding replies on the separate reservation channel.

Each node includes a primary receiver and a secondary receiver, which permits each node to continuously monitor the reservation channel, even when transmitting or receiving a message on one of the data channels. While monitoring the reservation channel, the nodes store the channel reservations that have been accomplished and avoid use of those channels until the reservations expire. The dedication of the second receiver overcomes the reservation knowledge lost with the use of a single receiver for both the reservation and data transfer mechanisms, which is a serious limitation of conventional CSMA/CA schemes.

By transmitting requests for channel access on a separate reservation channel and dedicating a receiver to receive and respond to such requests, transmission of information messages on the multiple parallel data channels can be coordinated among the nodes, collisions between request messages and information messages are eliminated, and collisions between the short request messages transmitted on the reservation channel are dramatically reduced.

As used herein, the term node refers to a communication device operating in a network of communication devices. The node may be a mobile communication device, such as a radio or wireless telephone, or the node may be stationary or fixed in a particular location. As used herein, the term channel refers to a communication path between nodes, and different channels can exist on separate communication media or on a common communication medium, with individual channels being separated by any suitable means, such as time, frequency, or encoding.

Figure 1:
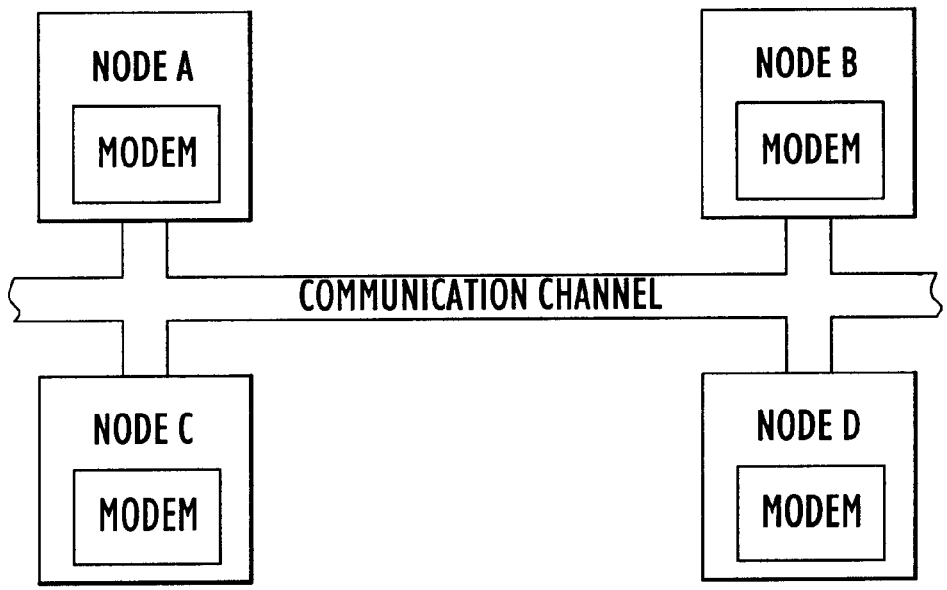
FIG. 1 is a functional block diagram illustrating a conventional network of nodes communicating on a single shared channel.
Figure 2:
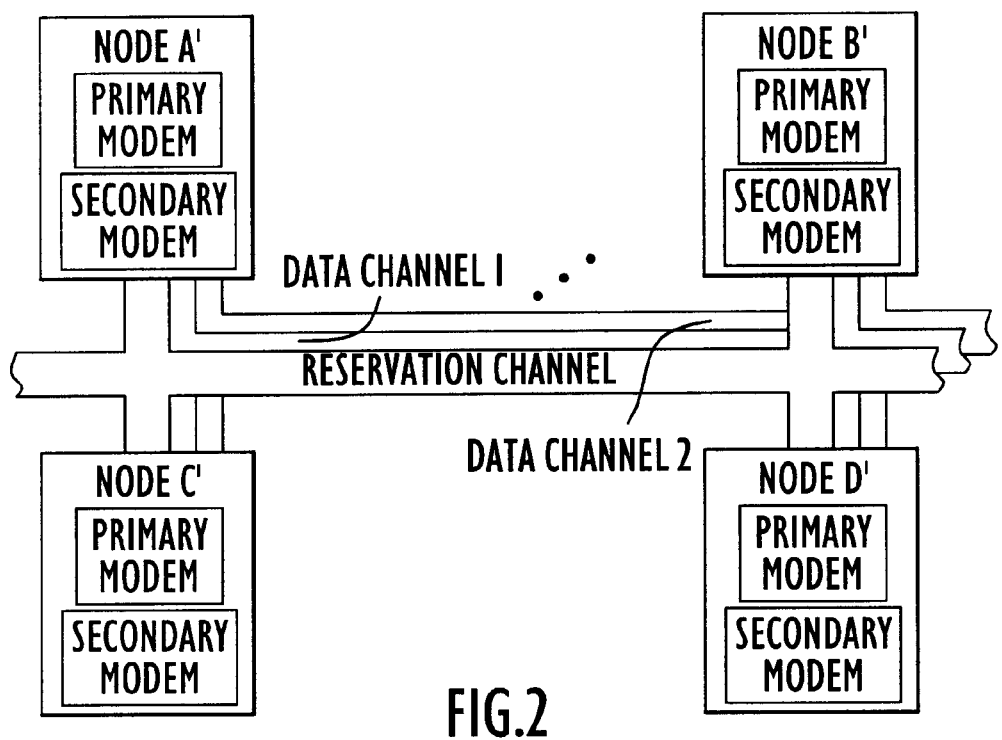
FIG. 2 is a function block diagram illustrating a network of nodes communicating on a plurality of parallel data channels and a reservation channel in accordance with an exemplary embodiment of the present invention.
Figure 3B:
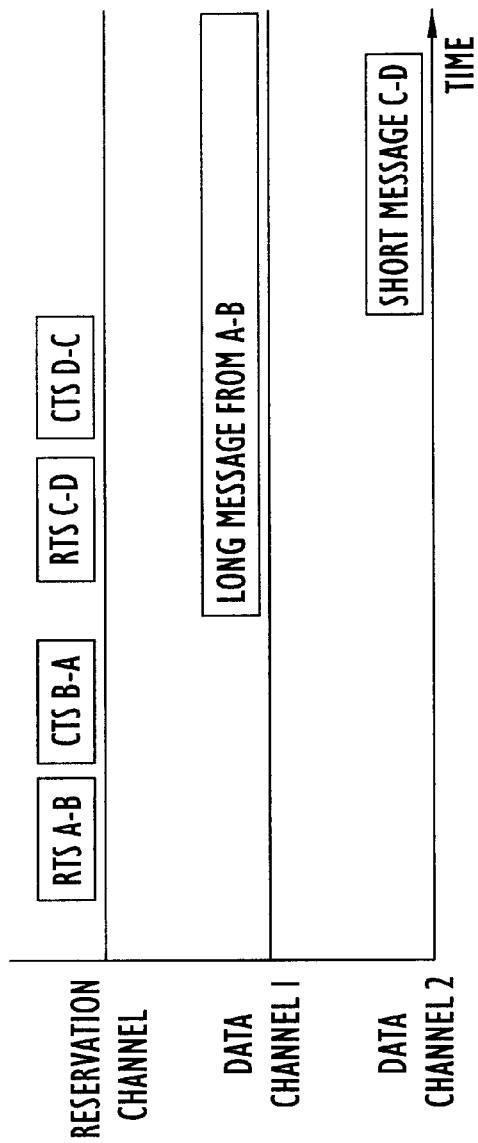
FIG. 3b is a time line of message events occurring on the reservation channel and the parallel data channels of FIG. 2 in accordance with the present invention.
Figure 3A:
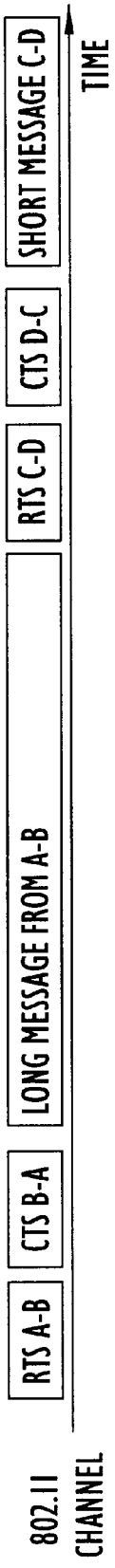
FIG. 3a is a time line of message events occurring on the conventional single shared channel of FIG. 1.

A conceptual contrast between a network of nodes sharing a single channel (e.g., CSMA/CA under the IEEE802.11 standard) and the reservation/multi-channel configuration of the present invention can be seen by comparing FIG. 1 with FIG. 2 and FIG. 3a with FIG. 3b. In FIG. 1, nodes A, B, C and D of a network communicate with each other over a single, shared communication channel which can be accessed by any of the nodes. Each of these nodes includes a single modem with a single transmitter and receiver.

In FIG. 2, nodes A', B', C' and D' can communicate over plural data channels as well as a reservation channel in accordance with the present invention. For convenience and ease of explanation, the communication channels shown in FIGS. 1 and 2 are depicted as having a bus-like architecture. However, it will be understood that these channels are not limited to any particular architecture or configuration, so long as each node has the ability to access the channels. The channels can exist over any communication medium, such as wire, optical fiber, or wireless (over-the-air), and may employ any suitable transmission protocol. Thus, for example, the nodes shown in FIG. 1 can be nodes of a wireless LAN communicating over a single channel using the IEEE802.11 CSMA/CA protocol.

Referring to FIG. 3a, when node A of FIG. 1 wishes to transmit a message to node B, node A first transmits a Request-to-Send (RTS) message to node B in order to notify node B and other nodes of its intent to reserve the channel. Upon receiving the RTS message, if no other nodes have earlier requested access to the channel (which node B would know from having received an RTS from another node on the channel), node B will reply to node A with a Clear-to-Send (CTS) message indicating that node A is cleared to transmit the information message on the channel. Upon receiving the CTS message, node A then transmits the information message to node B. While transmitting the information message, no other nodes may utilize the channel. Suppose, for example, that node C wishes to transmit a voice message to node D. Node C must wait until after the information message from node A to node B is completed before sending an RTS message to node D requesting access to the channel. Only after node D has replied to node C with a CTS message can the voice message be transmitted. If node A is transmitting a relatively long data message to node B, the delay in transmitting the voice message from node C to node D can be intolerably long.

Channel access in accordance with the present invention is illustrated in FIG. 3b. When node A' of FIG. 2 wishes to transmit a message to node B', node A' transmits a Request-to-Send (RTS) message to node B' in order to notify node B' and other nodes of its intent to reserve one of the available data channels. The RTS message is transmitted by node A' on the reservation channel. Each of the nodes includes a primary modem and a secondary modem. The primary modem is essentially a transceiver used both for transmission and reception of signals. The secondary modem also includes a receiver serving as a secondary receiver. As explained in greater detail hereinbelow, when a node is not engaged in transmission or reception of messages on one of the data channels, the secondary receiver is not used, and the receiver of the primary modem is tuned to the reservation channel. When a node is engaged in the transmission or reception of messages on one of the data channels, the primary receiver is tuned to that data channel while the secondary receiver is activated and tuned to the reservation channel. Consequently, each node is continuously monitoring the reservation channel with one of its two receivers.

Referring again to FIG. 3b, upon receiving the RTS from node A' on the reservation channel, assuming a data channel is available, node B' replies to node A' with a CTS message on the reservation channel. Upon receiving the CTS message, node A' then transmits the information message to node B on data channel "1". Because channel access requests are transmitted on the separate reservation channel, another node can transmit an RTS message shortly after a previous RTS/CTS exchange is completed without waiting for the subsequent information message to be completed. For example, as shown in FIG. 3b, if node C' wishes to send a message to node D', node C' can transmit an RTS message on the reservation channel after the CTS message from node B' to node A', irrespective of whether the information message being transmitted from node A' to node B' is still being transmitted on data channel 1. Node D' then replies to node C' with a CTS message, and Node C' subsequently transmits an information message on another available data channel, such as data channel "2". As seen in FIG. 3b, the information message sent from node C' to node D' on data channel 2 can be transmitted simultaneously with the information message sent from node A' to node B' on data channel 1. The message from node C' to node D' is transmitted with essentially no delay resulting from transmission of the long message transmitted from node A' to node B'.

The approach of the present invention essentially frees the reservation channel of multiple access collisions due to the short duration of the request-to-send message and the absence of long data transfers. The data transfers on the separate data channels also experience a reduction in collisions from the random burst errors created by request-to-send attempts from nodes that are out of range of the clear-to-send message associated with a data transfer. For example, in mobile ad-hoc networks (Extended Service Sets in the IEEE802.11 language), nodes will enter and leave the radio frequency range of a Basic Service Set (a Basic Service Set is essentially a group of nodes that are tied into an access point in a one hop sense). RF communications experience wide swings in their propagation ranges due to building, trees, and other structures. When buildings are between a transmitter and a receiver, a significant attenuation can result. In the case of a network operating under the IEEE802.11 protocol, this fluctuation can result in a node which is receiving a data message experiencing catastrophic interference from a node issuing an RTS or a message. This node might make the offending RTS transmission if it was unaware of the channel reservation due to a building or tree which was previously in the way, but no longer is. In accordance with the present invention, this destructive interference takes place on the reservation channel rather than on a data channel. If such an RTS message were to collide with another RTS message or a CTS message on the reservation channel, this collision would result in a retry of the reservation rather than a retry of an information message. This improvement is especially important with respect to real time services (e.g., audio and video) which require rapid delivery.

As will be understood from the foregoing, an important advantage of the present invention lies in the continuous monitoring of the reservation channel. Nodes that are involved in a data transfer do not lose any information regarding parallel data transfers that started after the current event. Given this universal knowledge, nodes that return to the reservation channel are able to make a more intelligent decision regarding the channel that is chosen for successive data transfers. This advantage of the present invention is especially critical to the reliable and timely delivery of real-time traffic such as Voice over the Internet protocol on a wireless LAN.

Figure 4:
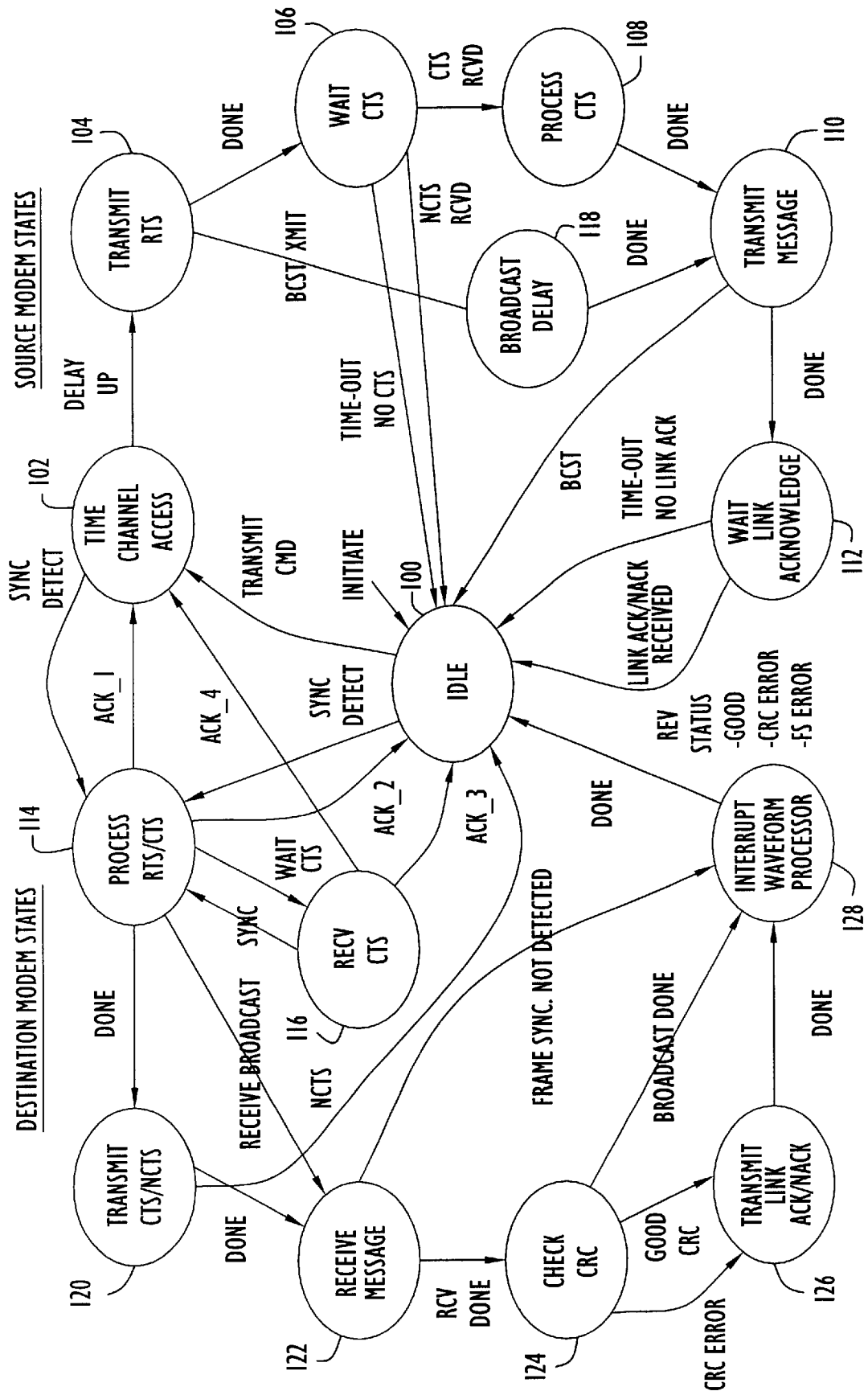
FIG. 4 is a state diagram illustrating the channel access state machine of the primary modem of a node in accordance with an exemplary embodiment of the present invention.
Figure 5:
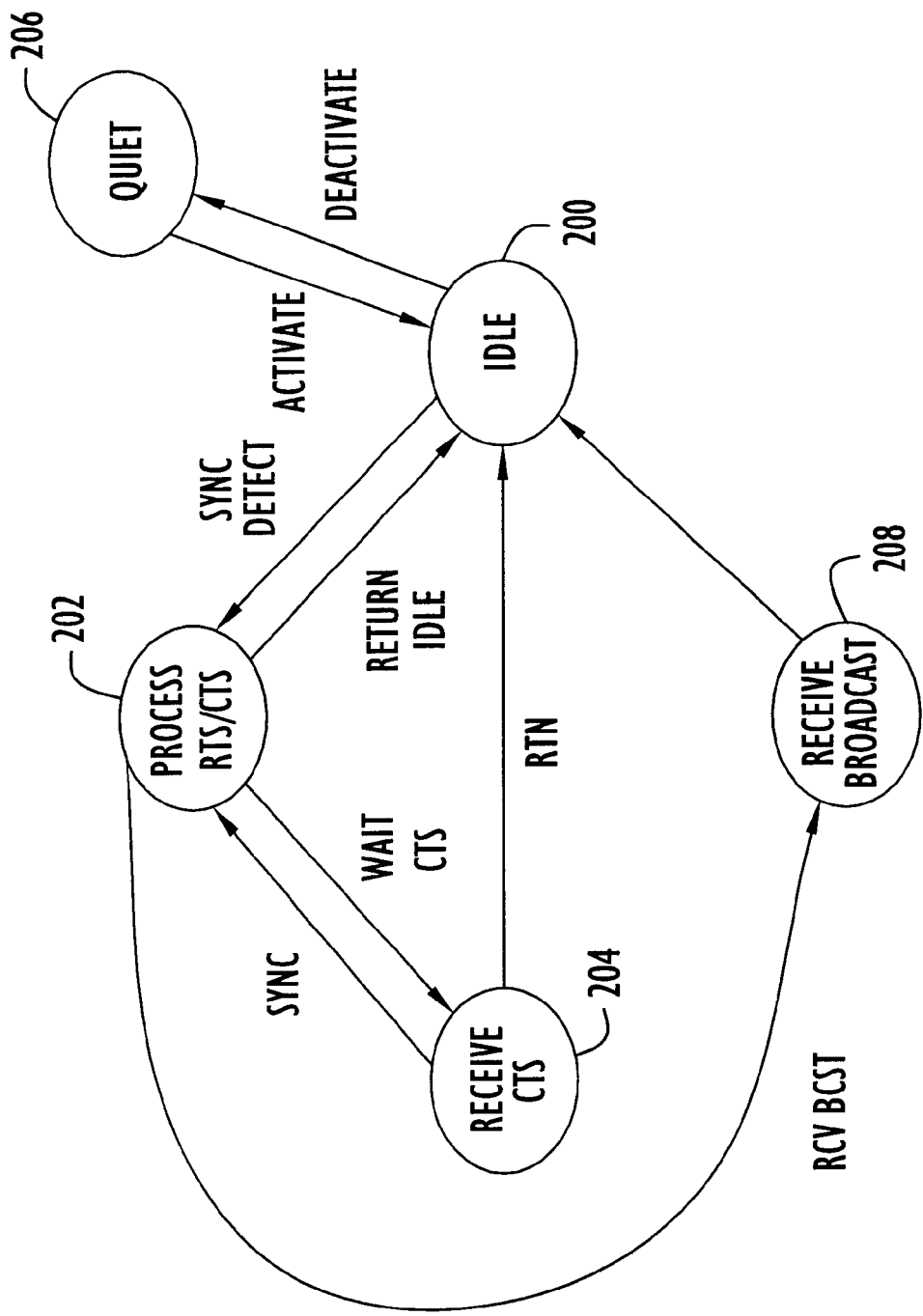
FIG. 5 is a state diagram illustrating the channel access state machine of the secondary receiver of a node in accordance with an exemplary embodiment of the present invention.

The following exemplary embodiment of the present invention in the context of a wireless LAN reveals the methods and apparatus of the present invention in detail. FIGS. 4 and 5 illustrate state diagrams of the primary and secondary modem of nodes in a system employing multi-channel carrier sense multiple access with enhanced collision avoidance (MC-CSMA/E-CA) in accordance with the exemplary embodiment. Specifically, a state diagram illustrating the channel access state machine of the primary modem of a node is shown in FIG. 4. This state machine implements the CSMA/CA protocol with multiple data channels. A state diagram illustrating the channel access state machine of the secondary receiver which provides enhanced collision avoidance is shown in FIG. 5.

For ease of description, the modem states shown in FIG. 4 are loosely separated into "source modem states" (right side of FIG. 4) that each primary modem may typically enter while in the process of transferring a message, and "destination modem states" (left side of FIG. 4) that each primary modem may typically enter while in the process of receiving a message. However, it will be understood that the states shown in FIG. 4 constitute a single state machine, and the primary modem of each node may enter any of these states.

Upon initial turn on and power up (INITIATE), each modem enters the IDLE state 100 and is tuned to the reservation channel. When a source node is attempting to transfer a message to a destination node, the standard cycle of modem states of the source node includes the states of IDLE (100), TIME CHANNEL ACCESS (102), TRANSMIT RTS (104), WAIT CTS (106), PROCESS CTS (108), TRANSMIT MESSAGE (110), WAIT LINK ACKNOWLEDGE (112), and back to IDLE (100). Deviations from this cycle are associated with the transmission of a broadcast message (No CTS required) or error conditions such as the reception of an RTS or CTS prior to the source modem's RTS attempt or the lack of a CTS reception.

More specifically, upon receiving a Transmit Command, the source modem transitions from the IDLE state 100 to the TIME CHANNEL ACCESS state 102. In the TIME CHANNEL ACCESS state 102, based on network conditions, it is determined whether to insert a delay (DELAY UP) prior to transmission of an RTS message to provide randomization of the start times from multiple nodes. This is especially important following the reception of a broadcast message where all nodes finish receiving at the same time. If, upon completion of the broadcast message, each node desiring channel access immediately attempted to transmit an RTS message on the reservation channel, the likelihood of a collision would be substantially greater than normal (i.e., it is much more likely that at least two nodes will transmit an RTS at the same time). Consequently, if a broadcast message has just been received, the TIME CHANNEL ACCESS will set a random time delay for transmitting the RTS message in order to randomize access to the channel so that the likelihood of plural nodes attempting to access the channel simultaneously is reduced.

A similar problem exists when only one data channel is available following transmission and reception of an information message. Prior to completion of the message, no data channels are available, and any nodes wishing to transfer messages will be aware that the first opportunity to access a data channel will occur at the end of the message. If two or more nodes wish to transfer a message and each transmits an RTS message on the reservation channel immediately upon completion of the information message, a collision will result. Consequently, in the TIME CHANNEL ACCESS state 102, a random delay is inserted prior to transmitting the RTS message to the destination node.

Conversely, if the network is substantially quiet, with at least some of the data channels being unoccupied, the TIME CHANNEL DELAY 102 will set a delay of zero seconds, such that the source modem essentially goes directly to the TRANSMIT RTS state 104, and the RTS message is sent to the destination node right away without delay on the reservation channel.

If, while in the TIME CHANNEL ACCESS state 102, the modem detects an arriving signal (SYNC DETECT) on the reservation channel, the modem transitions to the PROCESS RTS/CTS state 114 to determine what has been received, rather than transitioning to the TRANSMIT RTS state 104. If it is determined that the incoming signal is an RTS message requesting to transfer a message to another node (i.e., the RTS message requires no response by the modem), the modem expects to receive the reply CTS in the near future (in this scenario, the modem is "listening" to an RTS/CTS exchange between two other nodes on the reservation channel). At this point, although the node/modem wishes to send its own RTS message, the node recognizes that an RTS/CTS exchange has begun between two other nodes on the reservation channel, and that it must wait until the transaction is completed before transmitting its own RTS message. To wait for the anticipated reply CTS message (WAIT CTS), the modem transitions to the RECV CTS state 116. In the RECV CTS state 116, a timer keeps track of the elapsed time. If, after a predetermined time-out period has expired, the modem has not detect an incoming CTS message on the reservation channel, the modem returns to the TIME CHANNEL ACCESS state 102 (ACK__4) to resume the attempt to transmit an RTS message. Essentially, the modem assumes that, after a predetermined time, no reply CTS message will be forthcoming, so that the reservation channel is now available for the modem to send its own RTS message without risk of colliding with the reply CTS.

If, prior to the expiration of the time out period, the modem detects an incoming signal (SYNC) on the reservation channel, the modem returns to the PROCESS RTS/CTS state 114 to determine what has been received. If the received signal is the expected reply CTS message, the RTS/CTS exchange is completed, and the node recognizes that an information message will shortly be exchanged between two nodes on a data channel. If the upcoming transfer of the information message will require use of the last available data channel (i.e., all data channels will then be occupied) or if the transfer involves the destination node to which the source node had intended to send an RTS message, the source node cannot proceed with transmission of the RTS message. Accordingly, the modem transitions (ACK__2) from the PROCESS RTS/CTS state 114 to the IDLE state 100. If, on the other hand, the upcoming information message transfer will not occupy the last available data channel and does not involve the intended destination node, there is still a viable channel access attempt, so the modem returns (ACK__1) from the PROCESS RTS/CTS state 114 to the TIME CHANNEL ACCESS state 102 to resume the process of attempting to transmit an RTS message.

While in the TIME CHANNEL ACCESS state 102, when the RTS transmission delay time (DELAY UP) expires, the modem transitions to the TRANSMIT RTS state 104. In the TRANSMIT RTS state 104, when the source modem wishes to transfer an information message to a single destination node (i.e., not a broadcast message), the modem transmits the RTS message on the reservation channel to the destination node. The RTS message specifies the duration of the reservation time that the source node wishes to control a data channel in order to transfer an information message (i.e., an audio, video or data message). Typically, the RTS message presents the destination node with a number of options for setting transmission parameters for transferring the information message. The destination node then specifies in the reply CTS message the actual transmission parameters, including the data channel on which the information message is to be transmitted. After sending the RTS message (DONE) on the reservation channel, the source modem transitions to the WAIT CTS state 106. As the name implies, in the WAIT CTS state, the source modem waits for the arrival of a CTS message on the reservation channel from the destination node in reply to the RTS message.

In the WAIT CTS state 106, a timer keeps track of the elapsed time. If no reply CTS message is received by the modem on the reservation channel within a predetermined time-out period (TIME-OUT NO CTS), the modem transitions from the WAIT CTS state 106 to the IDLE state 100. As described in greater detail hereinbelow, the modem also transitions from the WAIT CTS state 106 to the IDLE state 100 when the destination node replies to the RTS message with a negative CTS (NCTS) message indicating that the source node should not transmit the information message.

If, prior to the time-out period, the modem receives the reply CTS message from the destination node (CTS RCVD) on the reservation channel, the modem transitions from the WAIT CTS state 106 to the PROCESS CTS state 108. The CTS message indicates the data channel on which the information message is to be transferred, and may provide various transmission parameters such as the transmit data rate and power level. After processing the CTS message (DONE), the modem transitions to the TRANSMIT MESSAGE state 110 in which the modem transmits the information message on the specified data channel. After transmitting the information message (DONE), the modem then transitions to the WAIT LINK ACKNOWLEDGE state 112 in which the modem waits to receive an acknowledge signal from the destination node, indicating that the information message was successfully received.

If the destination node successfully receives the information message without error, the destination node subsequently transmits a link acknowledge message back to the source node on the data channel indicating that the reception was successful. Upon receiving the link acknowledge message (LINK ACK RECEIVED), the modem transitions from the WAIT LINK ACKNOWLEDGE state 112 to the IDLE state 100. In the WAIT LINK ACKNOWLEDGE state 112, a timer keeps track of the elapsed time. If no link acknowledge message is received by the modem on the data channel within a predetermined time-out period (TIME-OUT NO LINK ACK), the modem transitions from the WAIT LINK ACKNOWLEDGE state 112 to the IDLE state 100. As described in greater detail hereinbelow, the modem also transitions from the WAIT LINK ACKNOWLEDGE state 112 to the IDLE state 100 when the destination node sends a negative acknowledge (NACK) message to the source node on the data channel, indicating that the received information message included bit errors or was corrupted in some manner.

If, instead of transmitting an information message to a particular destination node, the source node wishes to transmit a broadcast message to multiple neighboring nodes within a reception area, in the TRANSMIT RTS state 104, the source modem transmits an RTS message on the reservation channel indicating that the source node will shortly be transmitting the broadcast message. When any RTS message is transmitted on the reservation channel, all nodes within range of the transmitted signal receive the RTS message. As previously described, in the case of a single destination node, the source node must wait for a reply CTS message before transferring the information message on a specified data channel. With a broadcast message, every node capable of receiving the broadcast message is, in effect, an intended destination node. Since it would generally be impractical to receive a reply CTS message from every node, in the case of a broadcast message, the receiving nodes do not send CTS messages back to the source node. Accordingly, when sending a broadcast message (BCST XMIT), the modem transitions from the TRANSMIT RTS state 104 to a BROADCAST DELAY state 118. The BROADCAST DELAY state simply imparts a delay between transmission of the RTS message and transmission of the broadcast message. Once the delay period has elapsed (DONE), the modem transitions to the TRANSMIT MESSAGE state 110 in which the modem transmits the broadcast message on one of the data channels. After transmitting the broadcast message (BCST), the modem transitions to the IDLE state 100 (the nodes receiving the broadcast message do not respond with acknowledge messages).

When the node is the destination of a message sent by another node, the modem states complement the above-described source modem states. The standard sequence of modem states of the primary modem of a destination node attempting to receive a message includes the states of PROCESS RTS/CTS (114), TRANSMIT CTS (120), RECEIVE MESSAGE (122), CHECK CRC (124), TRANSMIT LINK ACK/NACK (126), and INTERRUPT WAVEFORM PROCESSOR (128).

More specifically, upon detecting an incoming signal (SYNC DETECT) on the reservation channel, the modem transitions from the IDLE state 100 to the PROCESS RTS/CTS state 114. If the received signal identified in the PROCESS RTS/CTS state 114 is an RTS message directed to the node itself (i.e., this node is the destination node of the message that the source node is requesting to send), upon completing processing of the RTS message (DONE), the modem transitions to the TRANSMIT CTS/NCTS state. If, on the other hand, the received signal is an RTS message that is directed to a different node (i.e., this node is not the destination node of the message the source node wishes to transfer), the modem will wait to receive the reply CTS message (WAIT CTS) from the destination node, and transitions to the RECV CTS state 116. As previously explained, in the RECV CTS state 116, a timer keeps track of the elapsed time. If, after a predetermined time-out period has expired, the modem has not detect an incoming signal on the reservation channel, the modem assumes that the CTS message will not be sent and returns (ACK__3) to the IDLE state. If, prior to the expiration of the time-out period, the modem detects an incoming signal (SYNC) on the reservation channel, the modem returns to the PROCESS RTS/CTS state 114 to determine what has been received. If the received signal is the expected reply CTS message, the RTS/CTS exchange is completed, and the node recognizes that an information message will shortly be exchanged between two nodes on a particular data channel. The modem then returns (ACK__2) from the PROCESS RTS/CTS state 114 to the IDLE state 100. The modem also transitions from the PROCESS RTS/CTS state 114 to the IDLE state 100 when a collision occurs on the reservation channel from which the modem cannot recover.

Returning again to the case where the arriving RTS message identifies this node as the destination node, from the TRANSMIT CTS/NCTS state 120, the modem transmits either a CTS message or a negative CTS message (NCTS) back to the source node. As explained in greater detail hereinbelow, if the destination node determines that the source node should not transfer the information message, the modem transmits a negative CTS message (NCTS) message to the source node on the reservation channel and returns to the IDLE state 100. Otherwise, the modem transmits a CTS message to the source node. The CTS message specifies the data channel on which the source modem is to transmit the information message as well as any number of other message transmission parameters. Upon completing transmission of the CTS message (DONE), the modem transitions to the RECEIVE MESSAGE state 122.

In the RECEIVE MESSAGE state 122, the modem waits for the information message until a time-out period has elapsed. If the time-out period expires without the modem receiving the message (FRAME SYNC NOT DETECTED, i.e., failing to achieve frame synchronization with the incoming message), the modem transitions to the INTERRUPT WAVEFORM PROCESSOR state 128. Frame synchronization may not be detected by the modem when RF conditions have changed between the source and destination nodes making reception difficult or impossible. For example, if RF conditions adversely change between the time of transmission of the RTS message by the source node and the time of transmission of the CTS message by the destination node, the source node may not successful receive the CTS message. Consequently, the source node may not even be attempting to transmit the information message while the destination modem is waiting in the RECEIVE MESSAGE state 122. Likewise, if RF conditions adversely change after transmission and reception of the CTS message, the subsequently transmitted information message may be undetectable at the destination modem.

If the modem does detect frame synchronization with the incoming information message (RCV DONE), the modem transitions from the RECEIVE MESSAGE state 122 to the CHECK CRC state 124 where the modem determines whether the received message has bit errors. Specifically, the modem determines from information in the first two bytes of the message how many bytes long the message is. Once that number of bytes has been received, the modem performs a cyclic redundancy check (CRC) to determine whether the received message contains any bit errors. If all the bits in the received message are correct (GOOD CRC), the modem transitions to the TRANSMIT ACK/NACK state 126 and transmits an acknowledge signal to the source node on the data channel indicating that the message was successfully received. If, on the other hand, the CRC detects bit errors in the received message (CRC ERROR), the modem transitions to the TRANSMIT ACK/NACK state 126 and transmits a negative acknowledge (NACK) signal to the source node on the data channel indicating that the message was not successfully received.

After transmitting the acknowledge or negative acknowledge signal to the source node (DONE), the modem transitions to the INTERRUPT WAVEFORM PROCESSOR state 128. Via an interrupt, the INTERRUPT WAVEFORM PROCESSOR state 128 passes a receive status indicator (REV STATUS) and, if successfully received, the received message up the protocol stack to the network processor (e.g., link layer software that responds to the receive status and/or information received in the message). The receive status informs the network processor whether the frame synchronization and CRC were successful (GOOD), the frame synchronization was not detected (FS ERROR) or the CRC detected bit errors in the received message (CRC ERROR). When the receive status is GOOD, the successfully received message is also provided to the network processor. If a message is not successfully received, the node may employ a random back-off algorithm which sets a random delay and may try to send the message again with different transmission parameters (e.g., with a lower data rate or higher power). After conveying the receive status and information message, the modem transitions to the IDLE state 100.

When a received RTS message indicates that a broadcast message is forthcoming (RECEIVE BROADCAST), the destination node does not reply with a CTS message; accordingly, the modem transitions directly from the PROCESS RTS/CTS state 114 to the RECEIVE MESSAGE state 122 (bypassing the TRANSMIT CTS/NCST state 120). Likewise, no acknowledge signal is sent in response to receiving a broadcast message; thus, once the CRC is completed on a broadcast message (BROADCAST DONE), the modem transitions directly from the CHECK CRC state 124 to the INTERRUPT WAVEFORM PROCESSOR state 128 (bypassing the TRANSMIT ACK/NACK state 126).

As will be evident from the foregoing description, the primary modem of the present invention is involved in transmitting and receiving RTS and CTS messages on the reservation channel as well as transmitting and receiving information messages and acknowledge signals on data channels. However, during the time the modem is involved in the transfer of an information message on a data channel, the modem cannot also be monitoring the reservation channel for RTS and CTS messages. Thus, without further measures, important information about which channels are occupied or available and which nodes are busy may be lost during transfer of information messages.

In accordance with another aspect of the present invention, each node includes a secondary modem or receiver for monitoring the reservation channel when the primary modem is otherwise occupied. The secondary receiver eliminates the problem of losing knowledge about the parallel data channels while the primary modem is involved in a message transfer on a data channel and is not listening on the reservation channel. While the secondary modem may include both transmitting and receiving capabilities, the exemplary embodiment of the present invention described herein relies on the secondary modem only for receiving signals; thus, the transmitter may optionally be patched out or eliminated altogether. Of course, while a secondary transmitter is not required by the present invention, it will be understood that the present invention does not exclude the use of a secondary transmitter or any other additional functionality within a network node.

A state diagram illustrating the channel access state machine of the secondary receiver is shown in FIG. 5. The secondary receiver generally monitors the reservation channel by cycling around the loop of states IDLE 200, PROCESS RTS/CTS 202, and RECV CTS 204. These states are comparable to the corresponding states in the state machine of the primary modem. The secondary receiver records all completed RTS/CTS transactions by noting which destinations are busy for how long and which data channel has been chosen to complete each transaction.

More specifically, in the IDLE state 200, the secondary receiver is monitoring the reservation channel waiting for the reception of an RTS or CTS message. Upon acquisition of one of these messages (SYNC DETECT), the state machine transitions to the PROCESS RTS/CTS state 202. In the PROCESS RTS/CTS state 202, the incoming RTS or CTS message is identified and channel state information is updated based on the contents of the RTS or CTS message. Both the RTS and CTS messages contain enough information to reveal which destinations are involved, what channel the nodes are using to communicate, and how long the nodes will be engaged in the message transfer and therefore unavailable for a message transfer with this node. Knowledge of this information also prevents this node from choosing the reserved channel and causing destructive interference to the ongoing communications.

Upon receiving an RTS message, the modem will wait to receive the reply CTS message (WAIT CTS) from the destination node, and transitions to the RECV CTS state 204. The RECV CTS state 204 is a holding state where the secondary receiver expects to receive a CTS in response to an RTS that was previously processes in the PROCESS RTS/CTS state 202. In the RECV CTS state 204, a timer keeps track of the elapsed time. If, after a predetermined time-out period has expired, the secondary receiver has not detect an incoming signal on the reservation channel, the secondary receiver assumes that the CTS message will not be sent and returns (RETURN IDLE) to the IDLE state 200. If, prior to the expiration of the time-out period, the secondary receiver detects an incoming signal (SYNC) on the reservation channel, the secondary receiver returns to the PROCESS RTS/CTS state 202 to determine what has been received. If the received signal is the expected reply CTS message, the RTS/CTS exchange is completed, and the node recognizes that an information message will shortly be exchanged between two nodes on a particular data channel. The secondary receiver then returns (RETURN IDLE) from the PROCESS RTS/CTS state 202 to the IDLE state 200.

Note that the secondary receiver typically expects to receive RTS and CTS messages that are directed to a different node (i.e., this node is not the destination node of the message the source node wishes to transfer). This is because the secondary receiver generally monitors the reservation channel only when the primary modem is engaged in a message transfer on a data channel and is temporarily unable to send any RTS messages and unavailable to respond to any incoming RTS messages. If the received signal identified in the PROCESS RTS/CTS state 202 is an RTS message directed to the node itself (i.e., this node is the destination node of the message that the source node is requesting to send), the secondary receiver transitions back to the IDLE state 200, since no CTS will be forthcoming from another node.

Still referring to FIG. 5, the QUIET state 206 of the secondary modem/receiver is used to save power when the primary modem is not involved in a message transfer on a data channel. In this state, the secondary receiver is powered down while the primary modem is monitoring the reservation channel. The timing of the transition of the secondary receiver between the QUIET state 206 and the IDLE state 200 can best be understood by referring back to the state machine of the primary modem shown in FIG. 4. In general, when the primary modem is in the IDLE state 100, it is "tuned" or "listening" to the reservation channel, and the secondary receiver is in the QUIET state 206 to save power. Likewise, in the states where the primary modem is transmitting, receiving, waiting for or processing RTS or CTS messages, the primary modem is tuned to the reservation channel and the secondary receiver is in the QUIET state 206. These primary modem states include: TIME CHANNEL ACCESS 102, TRANSMIT RTS 104, WAIT CTS 106, PROCESS CTS 108, PROCESS RTS/CTS 114, RECV CTS 116, AND TRANSMIT CTS/NCTS 120.

When the primary modem is transmitting or receiving a message on a data channel, the primary modem is re-tuned to the data channel, and the secondary receiver is activated from the QUIET state 206 to the IDLE state 200. In particular, when the primary modem transitions from either the PROCESS CTS state 108 or the BROADCAST DELAY state 118 to the TRANSMIT MESSAGE state 110, the primary modem is re-tuned to the data channel and the secondary receiver is tuned to the reservation channel and enters the IDLE state 200. Likewise, when the primary modem transitions from either the TRANSMIT CTS/NCTS state 120 or the PROCESS RTS/CTS state 114 to the RECEIVE MESSAGE state 122, the primary modem is re-tuned to the data channel, and the secondary receiver is tuned to the reservation channel and enters the IDLE state 200. Upon returning to the IDLE state 100 from the WAIT LINK ACKNOWLEDGE state 112 or the INTERRUPT WAVEFORM PROCESSOR state 128, the primary modem is re-tuned to the reservation channel and the secondary receiver is deactivated and returns to the QUIET state 206. As used herein, the terms "tune", "tunable", "re-tune" and "re-tunable" simply refer to a receiver making appropriate adjustments to detect signals on a particular channel. These adjustments are a function of the nature of the channels and how they are separated, and may involve adjustments in RF frequency, timing or coding. Thus, as broadly used herein, the terms "tuning" and "re-tuning" do not necessarily imply a changing of RF frequency.

As previously explained, when a particular node intends to transmit a broadcast message, each node receiving the preceding RTS message tunes to the data channel specified by the RTS message and awaits reception of the broadcast message. When the primary modem is not involved in the transfer of an information message on a data channel, reception of a broadcast message is handled by tuning the primary modem to the specified data channel (transitioning from the PROCESS RTSICTS state 114 to the RECEIVE MESSAGE state 122 in FIG. 4). However, in accordance with the present invention, even when the primary modem is engaged in the transfer of an information message, the node can still receive the broadcast message.

Referring again to FIG. 5, when the secondary receiver (which is activated because the primary modem is busy) detects an RTS message that indicates a forthcoming broadcast message (RCV BCST), the secondary modem transitions to a RECEIVE BROADCAST state 208. The RECEIVE BROADCAST state 208 provides an extended capability wherein the secondary modem re-tunes to a specified data channel and listens to the broadcast message on the data channel. Broadcast messages are intended to be heard by all nodes within range of the transmitter. In this case, it is assumed that the reception of this broadcast message is more important than the monitoring of the reservation channel. In general, the reservation channel should be unoccupied during the broadcast message, since all nodes in the neighborhood should also be receiving the broadcast message rather than transmitting RTS or CTS messages. Thus, although temporarily neither the primary modem nor the secondary modem is monitoring the reservation channel, no legitimate RTS or CTS messages should be sent on the reservation channel during the broadcast message anyway, since neighboring nodes are also listening to the broadcast. Even though the reservation channel may not be monitored during broadcast messages occurring simultaneously with the transfer of an information message, the reservation channel is still continuously monitored during periods when channel access reservation messages, such as RTS and CTS messages, are expected, since no channel access reservation messages are expected during a broadcast message. By re-tuning the secondary modem to the data channel of the broadcast, the node can simultaneously receive an information message on one data channel and the broadcast message on another data channel in parallel. Once the broadcast message is completed, the secondary modem is re-tuned to the reservation channel and returns to the IDLE state 200. Note that when the primary modem receives the broadcast message, the secondary receiver is able to monitor the reservation channel (although no RTS or CTS messages would be expected during the broadcast).

The negative clear-to-send (NCTS) and the negative acknowledge (NACK) messages provide a significant enhancement to the system of the present invention. These negative response messages give constructive feedback to the originating transmitter. The NCTS is used to indicate insufficient signal quality for the requested data rate and insufficient priority to insure high value data is reliably delivered on time. The negative CTS message, which is transmitted on the reservation channel, is created by the modem in response to an RTS message. A comparison is made between the incoming priority value in the CTS and the minimum acceptable priority level maintained by the network protocols. The modem will also return an NCTS message when there is insufficient signal quality to support successful reception of the information message. Based on the channel quality extracted by the modem from the RTS message, a table look-up is consulted to determine if a message transfer can be accomplished at the requested data rate. If the message cannot be expected to be completed successfully, the NCTS returns the resultant calculation that informs the transmitter of the data rate at which the message transfer can be successfully accomplished.

The negative acknowledgment message (NACK) is used to indicate a CRC failure. The NACK is transmitted from the destination node to the source node on the data channel which carried the information message. Embedded within the NACK message is the channel quality that was extracted. This information is used to significantly increase the probability of success on the next attempt through a change in the frequency band, data rate or power level.

In the above-described exemplary embodiment, each node employs a primary receiver and a secondary receiver in a particular manner to ensure that the reservation channel is continuously monitored during periods when channel access reservation messages (e.g., RTS, CTS and NCTS messages) are expected (i.e., at all times except during a broadcast message) by tuning one of the primary receiver and the secondary receiver to the reservation channel. While the implementation of the exemplary embodiment is particularly advantageous from the standpoint of minimizing power consumption and ease of transitioning between modem states, it will be appreciated that one or more transmitter and two receivers can be employed in a variety of ways to ensure continuous monitoring of the reservation channel. For example, one modem (transceiver) could be devoted to the reservation channel while another modem (transceiver) could be used to handle information message transfers on the data channels. Of course, this approach would require use of a second transmitter.

Another approach would be to devote one receiver to the reservation channel and the other receiver to the data channel, while using a single transmitter to transmit channel access reservation messages (RTS, CTS) on the reservation channel and information messages on the data channels. This approach may require complicated coordination between the reservation receiver and the transmitter to ensure successful RTS/CTS exchanges. Nevertheless, these and other such schemes that employ two receivers to ensure that a reservation channel is continuously monitored during periods when channel access reservation messages are expected fall within the scope of the invention.

When employed in a carrier sense multiple access/collision avoidance (CSMA/CA) scheme, the continuously-monitored reservation channel, the secondary receiver and the channel access information gained therefrom provide enhanced collision avoidance that is a significant leap beyond the current CSMA/CA algorithms employed in wireless LANs operating under the IEEE802.11 standard. CSMA/CA, as described in IEEE802.11 standard, does not address the use of multiple channels for a group. The present invention provides the capability to share multiple channels among a single group of users to yield a significant increase in the amount of data that can be transferred across a single wireless LAN, and provides an increase in the reliability that can be achieved with the CSMA/CA protocol. The addition of the second receiver that continuously monitors the reservation channel virtually eliminates message collisions in multi-hop mobile environments. The additional receiver maintains channel state and neighbor state information as a function of the data rate and message length. Continuous monitoring of the reservation channel by the second receiver permits the reception of all reservations which take place while the primary modem is involved in a message transfer, either transmission or reception. As previously described, the RTS and CTS messages contain all the information necessary to determine the participants, duration, and data channel which are reserved by the RTS/CTS exchange. Thus, every node knows when each data channel is busy. In the same manner, each node knows the busy status of each neighbor. This information is used to delay transmission attempts until a slotted contention period following the return of a channel and/or a neighbor from busy to free status.

In accordance with another aspect of the present invention, the contention interval is structured to insure that high priority messages and voice traffic are handled prior to routine file transfers that may take place at a later time with minimal penalty. Real time voice segments must be transmitted within a minimal amount of time (tens of milliseconds) to eliminate excessive delays in their reception (such delays are commonly noticed when a satellite link is used on a news report from a faraway foreign country). Permitting a long data exchange to take place when a voice message is waiting increases this delay effect and causes difficulty in the coordination of speakers. A contention interval where a data exchange must wait for voice messages or other higher priority traffic dramatically improves the reliability and delay characteristics of the voice and high priority traffic.

The contention interval is created by timing slots of a duration in excess of the combined time to transmit an RTS and CTS. Nodes attempting to transfer voice messages choose a slot near the beginning of the contention interval, and nodes attempting to transfer data messages choose a slot near the end. The random access opportunities in the slotted CSMA contention interval serve all users in an expeditious manner. The random nature insures extremely fast channel access and high channel efficiency at the expense of a minimal number of collisions. These collisions are quickly resolved by the CSMA/CA protocol via the RTS/CTS mechanism. A collision between RTS transmissions results in the transmitter not receiving a CTS. Lack of a CTS indicates that the RTS may have been corrupted and will cause the link layer protocols to initiate a random backoff to deliver the message after a minimal delay. This random backoff interval statistically insures that the colliding parties will not collide the next time they attempt a transmission.

The slotted contention interval is programmable with respect to the number of priority levels and the number of slots per priority class. For example, a contention interval can be created where the first five slots are reserved for nodes which have voice messages to transmit. The second five slots are reserved for video messages. The third five slots are reserved for nodes with high priority data messages and the final five slots are reserved for nodes with low priority data messages. The number of priority levels and number of slots per priority level are configurable to support the needs of the particular network. For example, a network with nodes which do not possess video equipment should not allocate slots for transmission of video signals. Although the node will provide a default set of slot assignments, the ability to program the slot table allows the user to customize performance of the channel access algorithms to address specific concerns such as voice priority, enhanced data throughput and large nets.

Another advantage of the present invention is the minimal delay to seize the channel. Whenever a channel and intended neighbor are free per the state information, channel access for a RTS attempt is granted without delay. If the neighbor is busy or all channel resources are in use, the message is transmitted according to the slotted CSMA/CA algorithm described above.

Figure 6:
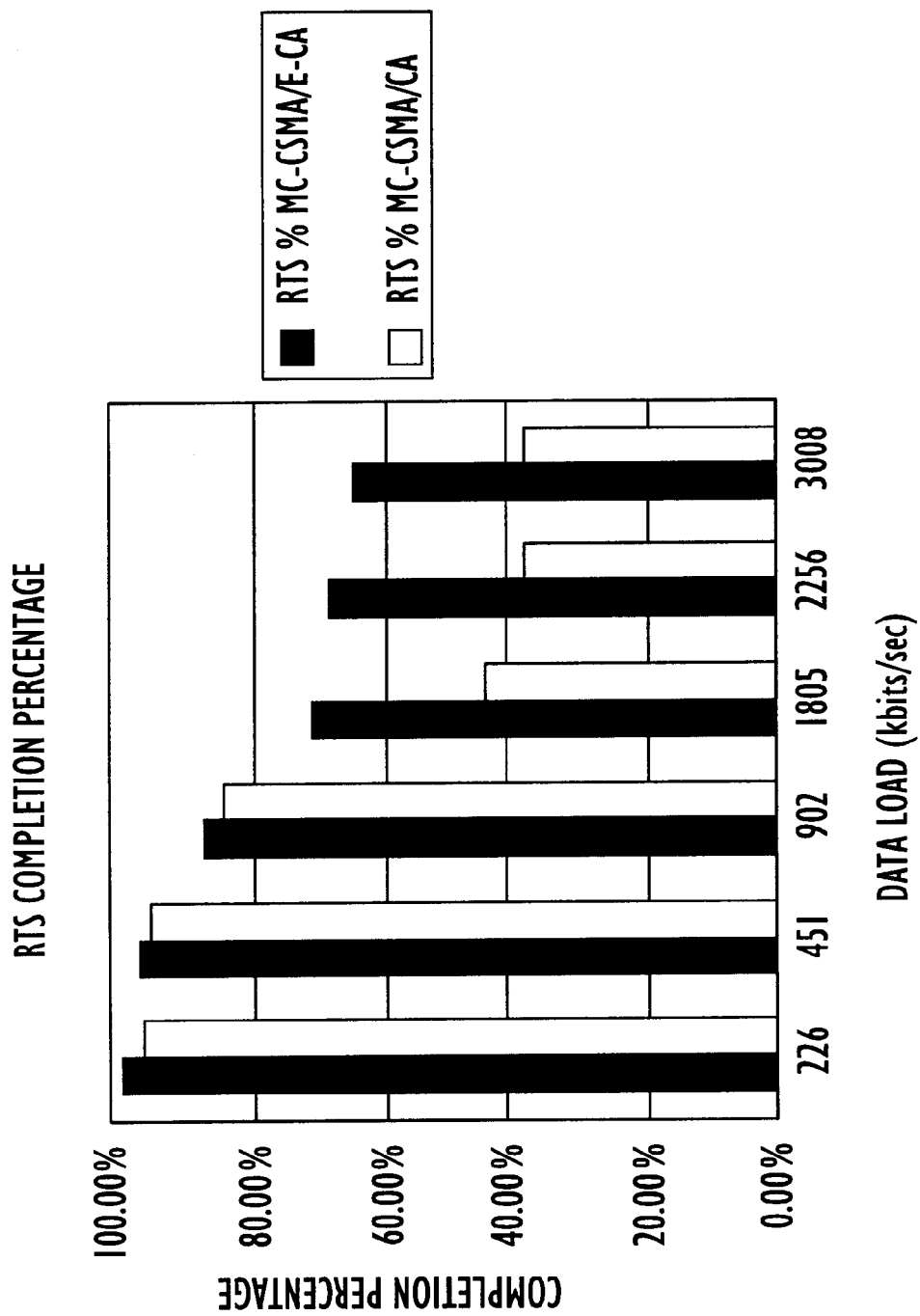
FIG. 6 is a bar chart illustrating the improved RTS completion rate resulting from the enhanced collision avoidance provided by the reservation channel of the present invention.

The enhanced collision avoidance provided by the reservation channel and secondary receiver of the present invention can be seen by comparing empirical channel access statistics collected from experimental tests conducted at a number of transmission data rates. FIG. 6 illustrates the percentage of RTS messages successfully received for a multi-channel carrier sense multiple access system with collision avoidance (MC-CSMA/CA) and for a MC-CSMA/CA system with the enhanced collision avoidance (MC-CSMA/E-CA) provided by the reservation channel and secondary receiver of the present invention. As is evident from FIG. 6, a significantly greater number of RTS message attempts is required for the channel access algorithm in the absence of the enhanced collision avoidance. Improvement in the RTS completion percentage directly affects the reliability of the message transfers and thus the performance of the network. Ideally, a one-to-one ratio would exist between the number of RTS messages and the number of information messages transferred.

Figure 7:
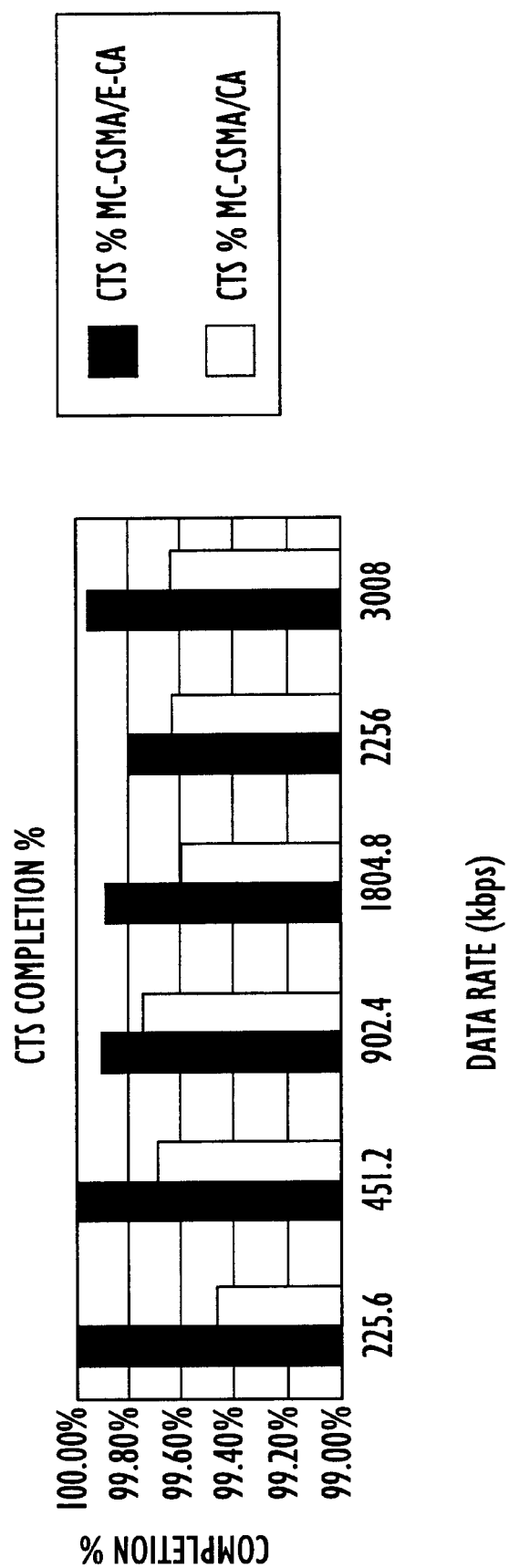
FIG. 7 is a bar chart illustrating the improved CTS completion rate resulting from the enhanced collision avoidance provided by the reservation channel of the present invention.
Figure 8:
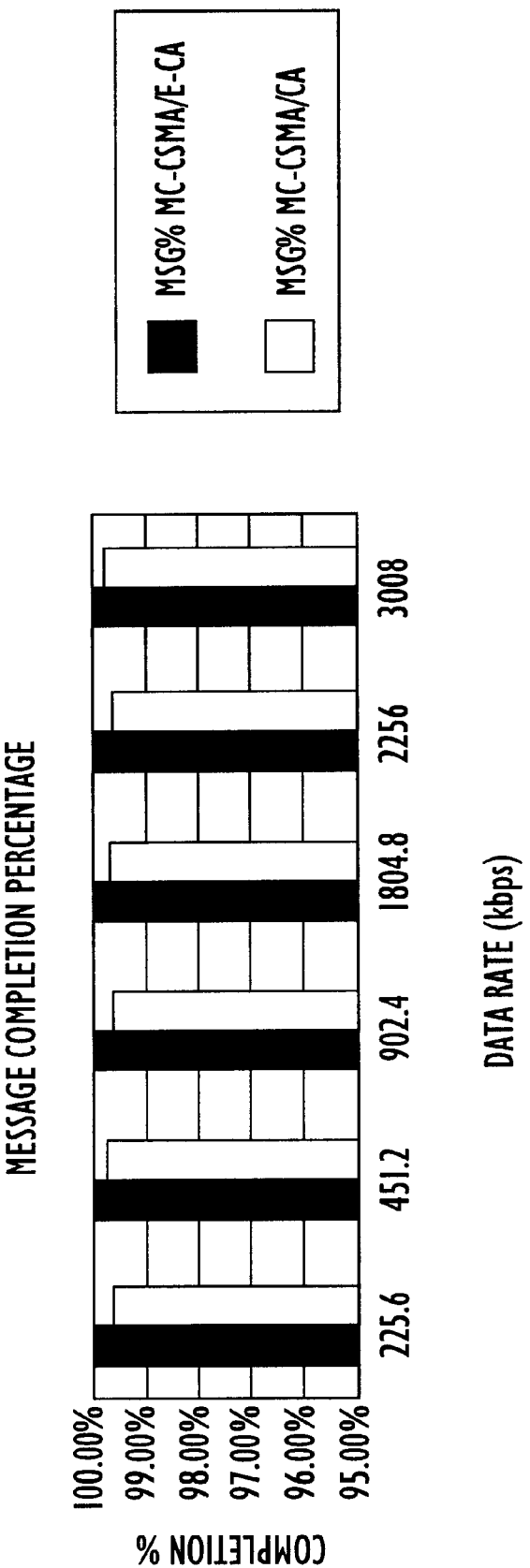
FIG. 8 is a bar chart illustrating the improved message completion rate resulting from the enhanced collision avoidance provided by the reservation channel of the present invention.

The performance improvements resulting from the neighbor state information (neighbors, channels and transfer durations) and the secondary receiver are equally striking when viewing the comparative CTS and Message completion rates in FIGS. 7 and 8. In FIG. 7, the CTS completion rates are the percentages of CTS messages completed given that the CTS message was sent. Similarly, in FIG. 8, the message completion rates are the percentages of information messages completed given that the information message was sent. The information message completion graph in FIG. 8 shows that, once a message is granted access in the enhanced scheme, the message is successfully delivered with an extremely high completion rate.

One of the key advantages of the enhanced collision avoidance scheme of the present invention is the ability to coordinate channel access to multiple parallel data channels among a group of users through continuous monitoring of a reservation channel with the assistance of a secondary receiver. Because each node is able to continuously monitor the reservation channel, each node accurately knows which data channels are busy and for how long and which neighboring nodes are presently busy (engaged in a message transfer). Thus, while the present invention has been described in the context of a CSMA/CA protocol for wireless LANs, it will be appreciated that the present invention is not protocol specific and can be applied to any network or protocol that could benefit from an improved channel access algorithm providing coordinated access to multiple parallel data channels shared among a group of nodes. Thus, for example, the present invention can potentially be applied in ALOHA schemes, slotted ALOHA schemes, dynamic TDMA (time division multiple access) schemes, CDMA (code division multiple access) schemes and CDMA/CA schemes to name a few. Moreover, the network to which the present invention is applied need not be a wireless local area network; the present invention can be used in networks of various sizes and networks that have communication channels over any type or combination of transmission media, including but not limited to wire, cable, optical fiber and wireless.

Having described preferred embodiments of new and improved methods and apparatus for coordinating channel access to shared parallel data channels, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A communication node operating in a network whose nodes communicate over plural shared data channels, said communication node comprising:

a primary receiver and a secondary receiver, at least one of said primary and secondary receivers being tunable to the plural shared data channels to receive information messages from other nodes, and at least one of said primary and secondary receivers being tunable to a reservation channel to monitor channel access reservation messages that are exchanged between nodes on the reservation channel;

wherein said communication node continuously monitors the reservation channel during periods when channel access reservation messages are expected by tuning one of the primary receiver and the secondary receiver to the reservation channel, and wherein said communication node maintains an availability status of each neighboring node and each of the plural shared data channels determined from the channel access reservation messages received on the reservation channel by said primary receiver or said secondary receiver; and wherein channel access reservation messages are not expected during transmission of a broadcast message on one of the plural shared data channels, and neither said primary receiver nor said secondary receiver monitors the reservation channel when said primary receiver is engaged in transferring an information message on one of the shared data channels and said secondary receiver is simultaneously receiving the broadcast message on another of the shared data channels.

2. The communication node of claim 1, wherein, when said primary receiver is tuned to the reservation channel, said secondary receiver is deactivated, and when said primary receiver is tuned to one of the plural shared data channels, said secondary receiver is activated and tuned to the reservation channel, such that the reservation channel is continuously monitored by one of said primary receiver and said secondary receiver when channel access reservation messages are expected.

3. The communication node of claim 1, wherein said communication node is a mobile communication device.

4. The communication node of claim 1, wherein said network is a wireless local area network operating under a multi-channel carrier sense multiple access with enhance collision avoidance (MC-CSMA/E-CA) protocol.

5. A communication node operating in a network whose nodes communicate over plural shared data channels, said communication node comprising:

a primary receiver and a secondary receiver, at least one of said primary and secondary receivers being tunable to the plural shared data channels to receive information messages from other nodes, and at least one of said primary and secondary receivers being tunable to a reservation channel to monitor channel access reservation messages that are exchanged between nodes on the reservation channel;

wherein, when said primary receiver is tuned to the reservation channel, said secondary receiver is deactivated, and when said primary receiver is tuned to one of the plural shared data channels, said secondary receiver is activated and tuned to the reservation channel, such that the reservation channel is continuously monitored by one of said primary receiver and said secondary receiver when channel access reservation messages are expected; and wherein said communication node maintains an availability status of each neighboring node and each of the plural shared data channels determined from the channel access reservation messages received on the reservation channel by said primary receiver or said secondary receiver.

6. The communication node of claim 5, wherein channel access reservation messages are not expected during transmission of a broadcast message on one of the plural shared data channels, and neither said primary receiver nor said secondary receiver monitors the reservation channel when said primary receiver is engaged in transferring an information message on one of the shared data channels and said secondary receiver is simultaneously receiving the broadcast message on another of the shared data channels.

7. The communication node of claim 5, wherein said communication node is a mobile communication device.

8. The communication node of claim 7, wherein said mobile communication device is one of a radio and a mobile telephone.

9. The communication node of claim 5, wherein said network is a wireless local area network operating under a multi-channel carrier sense multiple access with enhance collision avoidance (MC-CSMA/E-CA) protocol.

10. The communication node of claim 5, wherein said channel access reservation messages include a request-to-send (RTS) message transmitted on the reservation channel from a source node to a destination node and a clear-to-send (CTS) message transmitted on the reservation channel from the destination node to the source node.

11. The communication node of claim 5, wherein each information message contains audio, video or data information.

12. The communication node of claim 5, wherein said communication node prioritizes information messages based upon a type of information contained in the information messages.

13. The communication node of claim 5, wherein said communication node transmits channel access reservation messages on the reservation channel using a slotted contention interval to minimize collisions with channel access reservation messages transmitted by other nodes on the reservation channel.

14. The communication node of claim 13, wherein said communication node selects a time slot within the slotted contention interval for transmitting a channel access reservation message in accordance with a priority of a corresponding data message to be transmitted.

15. The communication node of claim 13, wherein said communication node randomly selects a time slot near the beginning of the slotted contention interval for transmitting a channel access reservation message corresponding to a high priority information message, and randomly selects a time slot near the end of the slotted contention interval for transmitting a channel access reservation message corresponding to a low priority information message.

16. The communication node of claim 15, wherein information messages containing audio information are high priority messages and information messages containing data are low priority information messages.

17. The communication node of claim 5, wherein the channel access reservation messages include negative channel access reply messages instructing a requesting node not to transmit an information message, and wherein, when said communication node receives a negative channel access reply message on the reservation channel, said communication node does not transmit a corresponding information message on a data channel.

18. The communication node of claim 17, wherein said communication node transmits a negative channel access reply message on the reservation channel in response to a requesting channel access reservation message when reception quality of an information message is expected to be below a predetermined threshold or a priority of the information message is insufficient.

19. The communication node of claim 17, wherein the negative channel access reply message is a negative clear-to-send message.

20. The communication node of claim 5, wherein said node transmits an acknowledgment message to a transmitting node on a data channel upon successfully completing reception of an information message.

21. The communication node of claim 5, wherein said node transmits a negative acknowledgment message to a transmitting node on a data channel upon receiving an information message containing bit errors.

22. A communication node operating in a network whose nodes communicate over plural shared data channels, said communication node comprising:
  a primary modem which includes a primary transmitter and a primary receiver; and
  a secondary receiver, at least one of said primary and secondary receivers being tunable to the plural shared data channels to receive information messages from other nodes, and at least one of said primary and secondary receivers being tunable to a reservation channel to monitor channel access reservation messages that are exchanged between nodes on the reservation channel, said primary transmitter being capable of transmitting channel access reservation messages on the reservation channel and information messages on the data channels;
  wherein said communication node continuously monitors the reservation channel during periods when channel access reservation messages are expected by tuning one of the primary receiver and the secondary receiver to the reservation channel, and wherein said communication node maintains an availability status of each neighboring node and each of the plural shared data channels determined from the channel access reservation messages received on the reservation channel by said primary receiver or said secondary receiver.

23. The communication node of claim 22, wherein said communication node is a mobile communication device.

24. The communication node of claim 23, wherein said mobile communication device is one of a radio and a mobile telephone.

25. The communication node of claim 22, wherein said network is a wireless local area network operating under a multi-channel carrier sense multiple access with enhance collision avoidance (MC-CSMA/E-CA) protocol.

26. The communication node of claim 22, wherein said channel access reservation messages include a request-to-send (RTS) message transmitted on the reservation channel from a source node to a destination node and a clear-to-send (CTS) message transmitted on the reservation channel from the destination node to the source node.

27. The communication node of claim 22, wherein each information message contains audio, video or data information.

28. The communication node of claim 22, wherein said communication node prioritizes information messages based upon a type of information contained in the information messages.

29. The communication node of claim 22, wherein said communication node transmits channel access reservation messages on the reservation channel using a slotted contention interval to minimize collisions with channel access reservation messages transmitted by other nodes on the reservation channel.

30. The communication node of claim 29, wherein said communication node selects a time slot within the slotted contention interval for transmitting a channel access reservation message in accordance with a priority of a corresponding data message to be transmitted.

31. The communication node of claim 29, wherein said communication node randomly selects a time slot near the beginning of the slotted contention interval for transmitting a channel access reservation message corresponding to a high priority information message, and randomly selects a time slot near the end of the slotted contention interval for transmitting a channel access reservation message corresponding to a low priority information message.

32. The communication node of claim 31, wherein information messages containing audio information are high priority messages and information messages containing data are low priority information messages.

33. The communication node of claim 22, wherein the channel access reservation messages include negative channel access reply messages instructing a requesting node not to transmit an information message, and wherein, when said communication node receives a negative channel access reply message on the reservation channel, said communication node does not transmit a corresponding information message on a data channel.

34. The communication node of claim 33, wherein said communication node transmits a negative channel access reply message on the reservation channel in response to a requesting channel access reservation message when reception quality of an information message is expected to be below a predetermined threshold or a priority of the information message is insufficient.

35. The communication node of claim 33, wherein the negative channel access reply message is a negative clear-to-send message.

36. The communication node of claim 22, wherein said node transmits an acknowledgment message to a transmitting node on a data channel upon successfully completing reception of an information message.

37. The communication node of claim 22, wherein said node transmits a negative acknowledgment message to a transmitting node on a data channel upon receiving an information message containing bit errors.

38. The communication node of claim 22, wherein channel access reservation messages are not expected during transmission of a broadcast message on one of the plural shared data channels, and neither said primary receiver nor said secondary receiver monitors the reservation channel when said primary receiver is engaged in transferring an information message on one of the shared data channels and said secondary receiver is simultaneously receiving the broadcast message on another of the shared data channels.

39. The communication node of claim 22, wherein, when said primary receiver is tuned to the reservation channel, said secondary receiver is deactivated, and when said primary receiver is tuned to one of the plural shared data channels, said secondary receiver is activated and tuned to the reservation channel, such that the reservation channel is continuously monitored by one of said primary receiver and said secondary receiver when channel access reservation messages are expected.

40. A communication network, comprising:
  a group of nodes, each including a primary receiver and a secondary receiver;
  a reservation channel for transmitting channel access reservation messages between nodes; and
  a plurality of data channels for transmitting information messages between nodes, wherein each node continuously monitors the reservation channel during periods when channel access reservation messages are expected by tuning one of the primary receiver and the secondary receiver to the reservation channel, and wherein said nodes coordinate transmission of information messages on the data channels in accordance with an availability status of each neighboring node and each of the data channels, the availability status being determined at each node from the channel access reservation messages received on the reservation channel by the primary receiver or the secondary receiver;
  wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels.

41. The network of claim 40, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel, such that the reservation channel is continuously monitored by one of the primary receiver and the secondary receiver when channel access reservation messages are expected.

42. The network of claim 40, wherein at least some of the nodes are mobile communication devices.

43. The network of claim 40, wherein said network is a wireless local area network operating under a multi-channel carrier sense multiple access with enhance collision avoidance (MC-CSMA/E-CA) protocol.

44. A communication network, comprising:
  a group of nodes, each including a primary receiver and a secondary receiver;
  a reservation channel for transmitting channel access reservation messages between nodes; and
  a plurality of data channels for transmitting information messages between nodes, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel, such that the reservation channel is continuously monitored by one of the primary receiver and the secondary receiver during periods when channel access reservation messages are expected, and wherein said nodes coordinate transmission of information messages on the data channels in accordance with an availability status of each neighboring node and each of the data channels, the availability status being determined at each node from the channel access reservation messages received on the reservation channel by the primary receiver or the secondary receiver.

45. The network of claim 44, wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels.

46. The network of claim 44, wherein at least some of the nodes are mobile communication devices.

47. The network of claim 46, wherein each of said mobile communication devices is one of a radio and a mobile telephone.

48. The network of claim 44, wherein said network is a wireless local area network operating under a multi-channel carrier sense multiple access with enhance collision avoidance (MC-CSMA/E-CA) protocol.

49. The network of claim 44, wherein said channel access reservation messages include a request-to-send (RTS) message transmitted on the reservation channel from a source node to a destination node and a clear-to-send (CTS) message transmitted on the reservation channel from the destination node to the source node.

50. The network of claim 44, wherein each information message contains audio, video or data information.

51. The network of claim 44, wherein information messages are prioritized based upon a type of information contained in the information messages.

52. The network of claim 44, wherein channel access reservation messages are transmitted on the reservation channel using a slotted contention interval to minimize collisions between channel access reservation messages transmitted by different nodes.

53. The network of claim 52, wherein nodes select a time slot within the slotted contention interval for transmitting a channel access reservation message in accordance with a priority of a corresponding data message to be transmitted.

54. The network of claim 52, wherein nodes randomly select a time slot near the beginning of the slotted contention interval for transmitting a channel access reservation message corresponding to a high priority information message, and randomly select a time slot near the end of the slotted contention interval for transmitting a channel access reservation message corresponding to a low priority information message.

55. The network of claim 54, wherein information messages containing audio information are high priority messages and information messages containing data are low priority information messages.

56. The network of claim 44, wherein the channel access reservation messages include negative channel access reply messages instructing a requesting node not to transmit an information message, and wherein nodes receiving a negative channel access reply message on the reservation channel do not transmit a corresponding information message on a data channel.

57. The network of claim 56, wherein nodes transmit a negative channel access reply message on the reservation channel in response to a requesting channel access reservation message when reception quality of an information message is expected to be below a predetermined threshold or a priority of the information message is insufficient.

58. The network of claim 56, wherein the negative channel access reply message is a negative clear-to-send message.

59. The network of claim 44, wherein each node transmits an acknowledgment message to a transmitting node on a data channel upon successfully completing reception of an information message.

60. The network of claim 44, wherein each node transmits a negative acknowledgment message to a transmitting node on a data channel upon receiving an information message containing bit errors.

61. A communication network, comprising:
- a group of nodes, each including a primary modem which includes a primary transmitter and a primary receiver, and a secondary receiver;
- a reservation channel for transmitting channel access reservation messages between nodes; and
- a plurality of data channels for transmitting information messages between nodes, wherein each node continuously monitors the reservation channel during periods when channel access reservation messages are expected by tuning one of the primary receiver and the secondary receiver to the reservation channel, said primary transmitter being capable of transmitting channel access reservation messages on the reservation channel and information messages on the data channels;
- wherein said nodes coordinate transmission of information messages on the data channels in accordance with an availability status of each neighboring node and each of the data channels, the availability status being determined at each node from the channel access reservation messages received on the reservation channel by the primary receiver or the secondary receiver.

62. The network of claim 61, wherein at least some of the nodes are mobile communication devices.

63. The network of claim 62, wherein each of said mobile communication devices is one of a radio and a mobile telephone.

64. The network of claim 61, wherein said network is a wireless local area network operating under a multi-channel carrier sense multiple access with enhance collision avoidance (MC-CSMA/E-CA) protocol.

65. The network of claim 61, wherein said channel access reservation messages include a request-to-send (RTS) message transmitted on the reservation channel from a source node to a destination node and a clear-to-send (CTS) message transmitted on the reservation channel from the destination node to the source node.

66. The network of claim 61, wherein each information message contains audio, video or data information.

67. The network of claim 61, wherein information messages are prioritized based upon a type of information contained in the information messages.

68. The network of claim 61, wherein channel access reservation messages are transmitted on the reservation channel using a slotted contention interval to minimize collisions between channel access reservation messages transmitted by different nodes.

69. The network of claim 68, wherein nodes select a time slot within the slotted contention interval for transmitting a channel access reservation message in accordance with a priority of a corresponding data message to be transmitted.

70. The network of claim 68, wherein nodes randomly select a time slot near the beginning of the slotted contention interval for transmitting a channel access reservation message corresponding to a high priority information message, and randomly select a time slot near the end of the slotted contention interval for transmitting a channel access reservation message corresponding to a low priority information message.

71. The network of claim 70, wherein information messages containing audio information are high priority messages and information messages containing data are low priority information messages.

72. The network of claim 61, wherein the channel access reservation messages include negative channel access reply messages instructing a requesting node not to transmit an information message, and wherein nodes receiving a negative channel access reply message on the reservation channel do not transmit a corresponding information message on a data channel.

73. The network of claim 72, wherein nodes transmit a negative channel access reply message on the reservation channel in response to a requesting channel access reservation message when reception quality of an information message is expected to be below a predetermined threshold or a priority of the information message is insufficient.

74. The network of claim 72, wherein the negative channel access reply message is a negative clear-to-send message.

75. The network of claim 61, wherein each node transmits an acknowledgment message to a transmitting node on a data channel upon successfully completing reception of an information message.

76. The network of claim 61, wherein each node transmits a negative acknowledgment message to a transmitting node on a data channel upon receiving an information message containing bit errors.

77. The network of claim 61, wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels.

78. The network of claim 61, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel, such that the reservation channel is continuously monitored by one of the primary receiver and the secondary receiver when channel access reservation messages are expected.

79. A method of coordinating channel access to a plurality of data channels shared among a group of network nodes, the method comprising the steps of:
(a) exchanging channel access reservation messages between nodes on a reservation channel to reserve channel access to data channels on which information messages are transferred between nodes;

(b) continuously monitoring the reservation channel at each node during periods when channel access reservation messages are expected by tuning one of a primary receiver of each node and a secondary receiver of each node to the reservation channel, wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels;

(c) maintaining at each node an availability status of each neighboring node and each of said data channels, the availability status being determined from the channel access reservation messages received on the reservation channel by the primary receiver or the secondary receiver; and (d) coordinating transmission of information messages between nodes on the data channels in accordance with the availability status of the nodes and the data channels.

80. The method of claim 79, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel, such that the reservation channel is continuously monitored by one of the primary receiver and the secondary receiver when channel access reservation messages are expected.

81. The method of claim 79, wherein the channel access reservation messages and the information messages are exchanged between nodes of a wireless local area network operating under a multi-channel carrier sense multiple access with enhance collision avoidance (MC-CSMA/E-CA) protocol.

82. The method of claim 79, wherein the information messages transmitted between nodes contain audio, video or data information.

83. A method of coordinating channel access to a plurality of data channels shared among a group of network nodes, the method comprising the steps of:

(a) exchanging channel access reservation messages between nodes on a reservation channel to reserve channel access to data channels on which information messages are transferred between nodes;

(b) continuously monitoring the reservation channel at each node during periods when channel access reservation messages are expected by tuning one of a primary receiver of each node and a secondary receiver of each node to the reservation channel, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel;

(c) maintaining at each node an availability status of each neighboring node and each of said data channels, the availability status being determined from the channel access reservation messages received on the reservation channel by the primary receiver or the secondary receiver; and (d) coordinating transmission of information messages between nodes on the data channels in accordance with the availability status of the nodes and the data channels.

84. The method of claim 83, wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels.

85. The method of claim 83, wherein the channel access reservation messages and the information messages are exchanged between nodes of a wireless local area network operating under a multi-channel carrier sense multiple access with enhance collision avoidance (MC-CSMA/E-CA) protocol.

86. The method of claim 83, wherein said channel access reservation messages include a request-to-send (RTS) message transmitted on the reservation channel from a source node to a destination node and a clear-to-send (CTS) message transmitted on the reservation channel from the destination node to the source node.

87. The method of claim 83, wherein the information messages transmitted between nodes contain audio, video or data information.

88. The method of claim 83, wherein information messages are prioritized based upon a type of information contained in the information messages.

89. The method of claim 83, wherein channel access reservation messages are transmitted on the reservation channel using a slotted contention interval to minimize collisions between channel access reservation messages transmitted by different nodes.

90. The method of claim 89, wherein nodes select a time slot within the slotted contention interval for transmitting a channel access reservation message in accordance with a priority of a corresponding data message to be transmitted.

91. The method of claim 89, wherein nodes randomly select a time slot near the beginning of the slotted contention interval for transmitting a channel access reservation message corresponding to a high priority information message, and randomly select a time slot near the end of the slotted contention interval for transmitting a channel access reservation message corresponding to a low priority information message.

92. The method of claim 91, wherein information messages containing audio information are high priority messages and information messages containing data are low priority information messages.

93. The method of claim 83, wherein the channel access reservation messages include negative channel access reply messages instructing a requesting node not to transmit an information message, and wherein nodes receiving a negative channel access reply message on the reservation channel do not transmit a corresponding information message on a data channel.

94. The method of claim 93, wherein nodes transmit a negative channel access reply message on the reservation channel in response to a requesting channel access reservation message when reception quality of an information message is expected to be below a predetermined threshold or a priority of the information message is insufficient.

95. The method of claim 93, wherein the negative channel access reply message is a negative clear-to-send message.

96. The method of claim 83, wherein each node transmits an acknowledgment message to a transmitting node on a data channel upon successfully completing reception of an information message.

97. The method of claim 83, wherein each node transmits a negative acknowledgment message to a transmitting node on a data channel upon receiving an information message containing bit errors.

98. A method of coordinating channel access to a plurality of data channels shared among a group of network nodes, the method comprising the steps of:

(a) exchanging channel access reservation messages between nodes on a reservation channel to reserve channel access to data channels on which information messages are transferred between nodes;

(b) continuously monitoring the reservation channel at each node during periods when channel access reservation messages are expected by tuning one of a primary receiver of each node and a secondary receiver of each node to the reservation channel;

(c) using a primary transmitter of each node to transmit channel access reservation messages on the reservation channel and information messages on the data channels;

(d) maintaining at each node an availability status of each neighboring node and each of said data channels, the availability status being determined from the channel access reservation messages received on the reservation channel by the primary receiver or the secondary receiver; and (e) coordinating transmission of information messages between nodes on the data channels in accordance with the availability status of the nodes and the data channels.

99. The method of claim 98, wherein the channel access reservation messages and the information messages are exchanged between nodes of a wireless local area network operating under a multi-channel carrier sense multiple access with enhance collision avoidance (MC-CSMA/E-CA) protocol.

100. The method of claim 98, wherein said channel access reservation messages include a request-to-send (RTS) message transmitted on the reservation channel from a source node to a destination node and a clear-to-send (CTS) message transmitted on the reservation channel from the destination node to the source node.

101. The method of claim 98, wherein the information messages transmitted between nodes contain audio, video or data information.

102. The method of claim 98, wherein information messages are prioritized based upon a type of information contained in the information messages.

103. The method of claim 98, wherein channel access reservation messages are transmitted on the reservation channel using a slotted contention interval to minimize collisions between channel access reservation messages transmitted by different nodes.

104. The method of claim 103, wherein nodes select a time slot within the slotted contention interval for transmitting a channel access reservation message in accordance with a priority of a corresponding data message to be transmitted.

105. The method of claim 103, wherein nodes randomly select a time slot near the beginning of the slotted contention interval for transmitting a channel access reservation message corresponding to a high priority information message, and randomly select a time slot near the end of the slotted contention interval for transmitting a channel access reservation message corresponding to a low priority information message.

106. The method of claim 105, wherein information messages containing audio information are high priority messages and information messages containing data are low priority information messages.

107. The method of claim 98, wherein the channel access reservation messages include negative channel access reply messages instructing a requesting node not to transmit an information message, and wherein nodes receiving a negative channel access reply message on the reservation channel do not transmit a corresponding information message on a data channel.

108. The method of claim 107, wherein nodes transmit a negative channel access reply message on the reservation channel in response to a requesting channel access reservation message when reception quality of an information message is expected to be below a predetermined threshold or a priority of the information message is insufficient.

109. The method of claim 107, wherein the negative channel access reply message is a negative clear-to-send message.

110. The method of claim 98, wherein each node transmits an acknowledgment message to a transmitting node on a data channel upon successfully completing reception of an information message.

111. The method of claim 98, wherein each node transmits a negative acknowledgment message to a transmitting node on a data channel upon receiving an information message containing bit errors.

112. The method of claim 98, wherein channel access reservation messages are not expected during transmission of a broadcast message on one of the data channels, and neither said primary receiver nor said secondary receiver of each node monitors the reservation channel when said primary receiver is engaged in transferring an information message on one of the data channels and said secondary receiver is simultaneously receiving the broadcast message on another of the data channels.

113. The method of claim 98, wherein, when the primary receiver of a node is tuned to the reservation channel, the secondary receiver of the node is deactivated, and when the primary receiver of the node is tuned to one of the data channels, the secondary receiver of the node is activated and tuned to the reservation channel, such that the reservation channel is continuously monitored by one of the primary receiver and the secondary receiver when channel access reservation messages are expected.

* * * * *